(12) United States Patent
Raitses

(10) Patent No.: US 12,325,537 B2
(45) Date of Patent: Jun. 10, 2025

(54) AIR-BREATHING PLASMA THRUSTER

(71) Applicant: United States Department of Energy, Washington, DC (US)

(72) Inventor: Yevgeny Raitses, Princeton, NJ (US)

(73) Assignee: U.S. Department of Energy, Washington, DC (US)

( * ) Notice: Subject to any disclaimer, the term of this patent is extended or adjusted under 35 U.S.C. 154(b) by 0 days.

(21) Appl. No.: 18/374,941

(22) Filed: Sep. 29, 2023

(65) Prior Publication Data
US 2025/0108939 A1    Apr. 3, 2025

(51) Int. Cl.
*B64G 1/40*    (2006.01)
*F03H 1/00*    (2006.01)

(52) U.S. Cl.
CPC .......... *B64G 1/413* (2023.08); *B64G 1/4005* (2023.08); *B64G 1/411* (2023.08); *F03H 1/0037* (2013.01); *F03H 1/0068* (2013.01); *F03H 1/0081* (2013.01); *F03H 1/0087* (2013.01); *F03H 1/0093* (2013.01)

(58) Field of Classification Search
CPC ...... B64G 1/4005; B64G 1/411; B64G 1/413; F03H 1/0037; F03H 1/0068; F03H 1/0081; F03H 1/0087; F03H 1/0093
See application file for complete search history.

(56) References Cited

U.S. PATENT DOCUMENTS 10,184,460 B2 * 1/2019 Hey ............... F03H 1/0068
11,473,569 B2 * 10/2022 Allen ................. H05H 1/54
11,510,307 B1 * 11/2022 Perricone ........... H05H 1/2406
2020/0263674 A1    8/2020 Winglee et al.
2021/0301797 A1 * 9/2021 Allen .................. F03H 1/0081

OTHER PUBLICATIONS

Andreussi et al., "A review of air-breathing electric propulsion: from mission studies to technology verification." Journal of Electric Propulsion 1.1 (2022): 31.
Raitses, et al., "Parametric Investigations of Non-conventional Hall Thruster", Phys. Plasmas 8, 2579-2586 (2001) https://doi.org/10.1063/01/2001.
Karfidov et al., "Ionization of a low pressure gas by a stream of electrons.".
Raitses, et al., Parametric Investigations of Non-conventional Hall Thruster, Phys. Plasmas 8, 2579-2586 (2001) https://doi.org/10.1063/01/2001 (Unchanged).
Andreussi, et al. A review of air-breathing electric propulsion: from mission studies to technology verification, Journal of Electric Propulsion (2022) 1:31 (Unchanged).

* cited by examiner

*Primary Examiner* — Kyle Robert Thomas
(74) *Attorney, Agent, or Firm* — Timothy Harney; Aaron Keith; Michael Dobbs

(57) ABSTRACT

One or more embodiments relates to an air-breathing plasma thruster including a thruster wall, an anode, a cathode, and at least one ring electrode. The thruster wall defines a cylindrical channel, the cylindrical channel having a first end and an opposing second end in fluid communication with the first end, where the cylindrical channel is adapted to receive incoming airflow. The anode is at the first end of the channel and the cathode is at the second end of the channel opposite the first end. The at least one ring electrode is positioned on the thruster wall.

21 Claims, 8 Drawing Sheets

AIR-BREATHING PLASMA THRUSTER

STATEMENT OF GOVERNMENT SUPPORT

The United States Government has rights in this invention pursuant to a contractual relationship between the United States Government and the Princeton Plasma Physics Laboratory.

FIELD OF THE INVENTION

Embodiments relate to a plasma thruster. More specifically embodiments relate to satellite propulsion at very low orbits using an air-breathing plasma thruster.

BACKGROUND

One or more embodiments relate to the propulsion of satellites operating at very low earth orbits (VLEO) at an altitude below about 250 km, but generally between about 70 and 250 km. Being able to operate satellites in VLEOs provides a number of advantages in terms of orbit accessibility, payload performance, protection from radiation, and end-of-life disposal.

It should be appreciated however that lowering the operative altitude of a satellite increases the atmospheric drag acting thereon, which requires a corresponding increase in thrust to offset the drag. Satellites generally require a propulsion device to provide such thrust and compensate for such atmospheric drag. One solution has been to use a thruster device with stored propellants. It should be appreciated that the amount of stored propellant is the main limiting factor affecting the useful lifetime of the satellite.

Alternatively, air-breathing thrusters have been utilized to compensate for drag. Such air-breathing thrusters don't require carrying propellant as they utilize the surrounding incoming air as the thruster propellant. One example of an air-breathing thruster is the air-breathing electric propulsion (ABEP) thruster 10 illustrated in FIG. 1. Thruster 10 has inlet 12, body 14, and outlet 16, relying on inlet 12 (moving in the direction of travel 20) to collect the atmosphere 18 which generates drag. Using electric power, in one embodiment, gathered from solar arrays 22 and power processing unit 24, the thruster 10 ionizes and accelerates the atmospheric particles, generating a plasma jet 26 at outlet 16 that produces thrust in the direction of motion at outlet 16. By exploiting these scarce and yet renewable resources, it is possible not only to lower the operating altitude but also to untie the link between lifetime and stored propellant, keeping a spacecraft in a very low Earth orbit (VLEO) for an extended period of time.

There are a number of alternate air-breathing plasma propulsion concepts proposed for low-orbit satellites. These thrusters usually use a placed at the inlet 12 of the thruster. The compressor is used to increase the air pressure to levels at which ionization of the incoming air can be sustained. The resulting ions can then be accelerated out of the thruster, generating thrust. However, it should be appreciated that using a compressor at the inlet increases the air drag and, as a result, requires a larger thrust and thereby, higher power. Additionally, the outgoing flux of ions is charged and current neutralized by the flux electrons from the cathode-neutralizer. This is to prevent a satellite charging which could attract accelerated ions back to the thruster causing an unwanted recoil and net zero momentum on the satellite.

FIG. 2 depicts an example of another thruster, a cylindrical Hall thruster (CHT) 50 generating thrust 62. As illustrated, the thruster 50 consists of a channel 52 (a Boron-Nitride ceramic channel for example), an annular anode 54, which serves also as a gas distributor, two electromagnetic coils 58, and a magnetic core 60. FIG. 2 further illustrates the CHT thruster 50 has a cathode-neutralizer 56. The CHT thruster 50 differs from conventional annular and end-Hall thrusters in that it has a cylindrical configuration with an enhanced radial component of a cusp-type magnetic field, where the magnetic field lines intersect the ceramic channel walls.

A need exists in the art for an air-breathing thruster, used with satellites for example, that reduces or eliminates the need for storing propellant and the requirements for air compression at the inlet, while still compensating for atmospheric drag.

SUMMARY

One object of at least one embodiment is related to propulsion. More specifically, embodiments relate to air-breathing thrusters that provide propulsion for satellites for example.

One or more embodiments relate to the propulsion of satellites operating at very low earth orbits (VLEO) at an altitude below about 250 km, but generally between about 70 and 250 km. The flights of such satellites generally would require a propulsion device to compensate for atmospheric drag. The satellite with such an air-breathing thruster would not need to carry a propellant because it utilizes the surrounding incoming air as the thruster propellant.

More specifically embodiments relate to an air-breathing plasma thruster including a thruster wall, an anode, a cathode, and at least one additional, intermediate electrode which may comprise a ring electrode, a semi-ring electrode, a non-ring electrode, and combinations thereof. The thruster wall defines a cylindrical channel, the cylindrical channel having a first end and an opposing second end in fluid communication with the first end, where the cylindrical channel is adapted to receive incoming airflow. The anode is at the first end of the channel and the cathode is at the second end of the channel opposite the first end. The at least one intermediate electrode is positioned on the thruster wall between the anode and the cathode for example Another embodiment relates to a satellite having an air-breathing plasma thruster, the air-breathing plasma thruster including a thruster wall, an anode, a cathode, at least one additional, intermediate electrode (an exit ring electrode for example), and a plurality of ring electrodes. The thruster wall has a plurality of magnetic fields formed therein and defines a cylindrical channel, the cylindrical channel has a first end and an opposing second end in fluid communication with the first end, where the cylindrical channel is adapted to receive an incoming airflow. The anode is proximate to the first end and the cathode is proximate to the second end. The at least one exit ring electrode is positioned on the thruster wall between the anode and the cathode, and the plurality of ring electrodes are positioned on the thruster wall between the at least one exit electrode and the anode.

Yet another embodiment relates to a method of forming a plasma jet using an air-breathing plasma thruster. The method includes receiving incoming air flow in a cylindrical channel defined by the inside wall of the air-breathing thruster, forming a volume of air; and ionizing the volume air using electron beams generated by cathodes and confined by segmented electrodes and a cusp magnetic field, forming ionized air. Embodiments of the method further include accelerating the ionized air using applied electric and diverging magnetic fields, forming a plasma jet; and generating the plasma jet at an outlet of the air-breathing thruster.

In one or more embodiments, the at least one ring electrode is positioned proximately the first end, where the at least one ring electrode is biased positive and the at least the anode is biased positive.

Embodiments are contemplated wherein the first end is an inlet having the anode and at least one ring electrode proximate thereto and the second end is an outlet having the cathode proximate thereto. Other embodiments may include the first end is an outlet having the anode and at least one ring electrode proximate thereto and the second end is an inlet having the cathode proximate thereto.

It should be appreciated that embodiments may include a plurality of ring electrodes positioned on the thruster wall and biased negative with respect to the anode or kept floating with respect to the anode and cathode. In one or more embodiments a bias voltage is applied to the plurality of ring electrodes wherein the bias voltage is selected from the group consisting of a DC bias, an RF bias, a pulsed bias, and a combination of a DC-RF and pulsed bias.

Still other embodiments include the at least one of the plurality of electrodes is an electron-emitting electrode. The electron-emitting electrode may be selected from the group consisting of ion-induced secondary electron emission electrodes, thermionic emission electrodes, field emission electrodes, and plasma cathodes (an RF plasma cathode for example).

One or more embodiments include applying an extra bias between the plurality of ring electrodes to control electron flow between the electrodes and plasma flow in the channel. To sustain ionization by electron beam at low pressure (mtorr and below), embodiments of the thruster are of sufficient length so that the ionization probability of incoming high-speed air would be reasonably high. In one or more embodiments, the cylindrical chamber is longer than an ionization mean free path (having a length extending from a few millimeters at an altitude of 100 km to nearly 1 m at the altitude of 150-160 km, and several meters at 200 km for example) to ionize incoming airflow. The apparatus may increase the slipping friction of the air on the outer side wall of the thruster. As a result, power requirements would grow with the thruster length.

Additional embodiments are contemplated in which the at least one exit ring electrode is biased positive and the plurality of ring electrodes are biased negative with respect to the exit ring electrode. Similarly, the embodiments include the anode is biased positive and the plurality of ring electrodes are biased negative with respect to the anode. The thruster in accordance to one or more embodiments is adapted to operate at very low orbits at an altitude below about 250 km, between about 75 and 250 km for example.

BRIEF DESCRIPTION OF THE DRAWINGS

The invention together with the above and other objects and advantages will be best understood from the following detailed description of the preferred embodiment of the invention shown in the accompanying drawings, wherein.

DETAILED DESCRIPTION

The foregoing summary, as well as the following detailed description of certain embodiments of the present invention, will be better understood when read in conjunction with the appended drawings.

The following detailed description should be read with reference to the drawings in which similar elements in different drawings are numbered the same. The drawings, which are not necessarily to scale, depict illustrative embodiments and are not intended to limit the scope of the invention.

Embodiments relate to propulsion. More specifically embodiments relate to air-breathing plasma thrusters used with satellites, for example, providing propulsion at very low earth orbits (VLEO) at an altitude below about 250 km, but generally between about 75 and 250 km. One or more embodiments of the invention includes an air-breathing thruster, and a satellite using one or more embodiments of such air-breathing thruster and a method for providing thrust for a satellite for example using incoming air, therefore eliminating the need for propellants and/or compressors of prior art thrusters.

Embodiments of the present air-breathing thruster concept either reduces requirements for air compression at the inlet or eliminate the need entirely. As a result, a satellite using one or more embodiments of the present thruster should experience less air drag and therefore, require less power.

One advantage of embodiments of the air-breathing thruster of the present invention as compared to the previously known air-breathing plasma thrusters is that embodiments do not require a compression stage or includes a low compression ratio compressor. As a result, embodiments of the invention induce less drag and require less power for the thruster than these existing air-breathing plasma propulsion concepts with high compression ratio compressors placed at the air inlet to the thruster.

Figure 3:
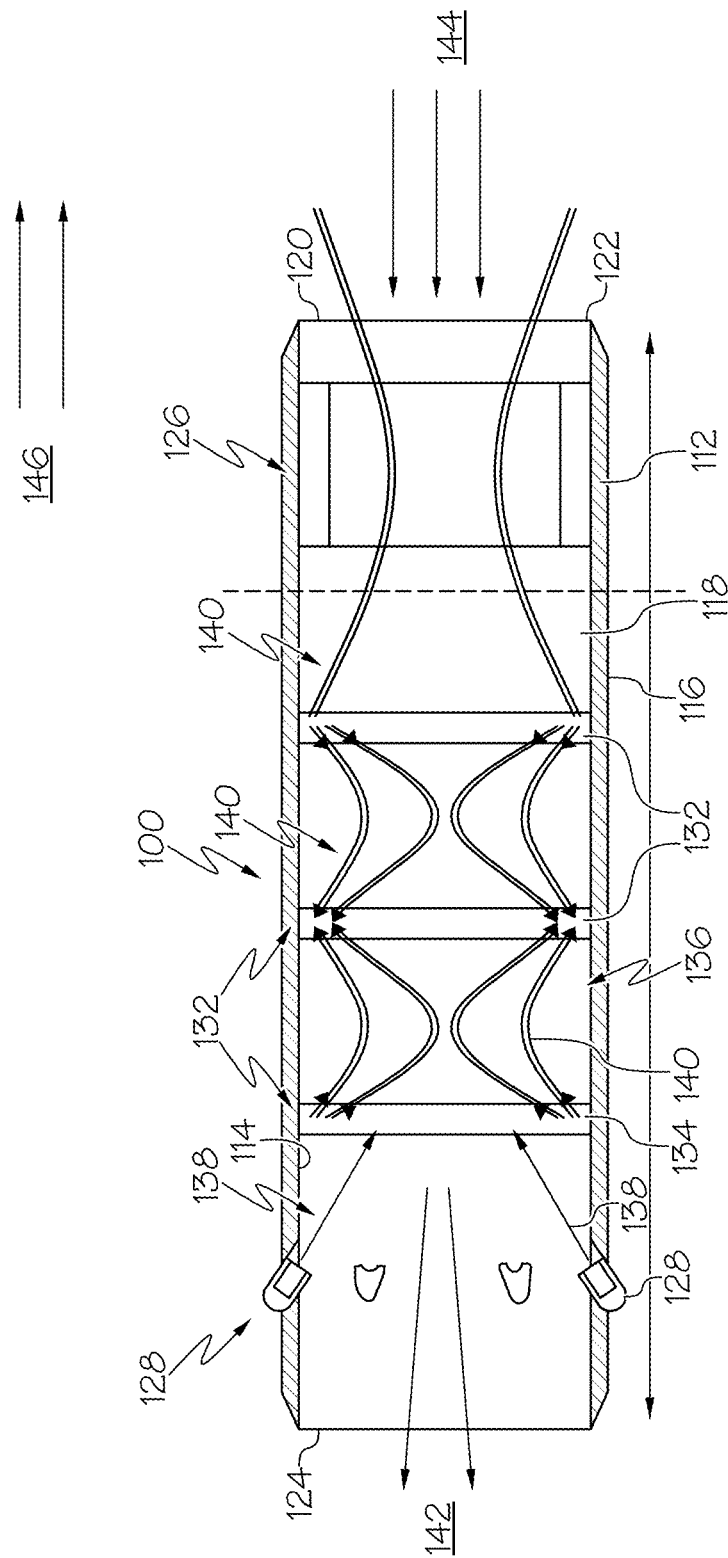
FIG. 3 depicts a block diagram of an air-breathing thruster in accordance with one embodiment of the present invention.
Figure 4:
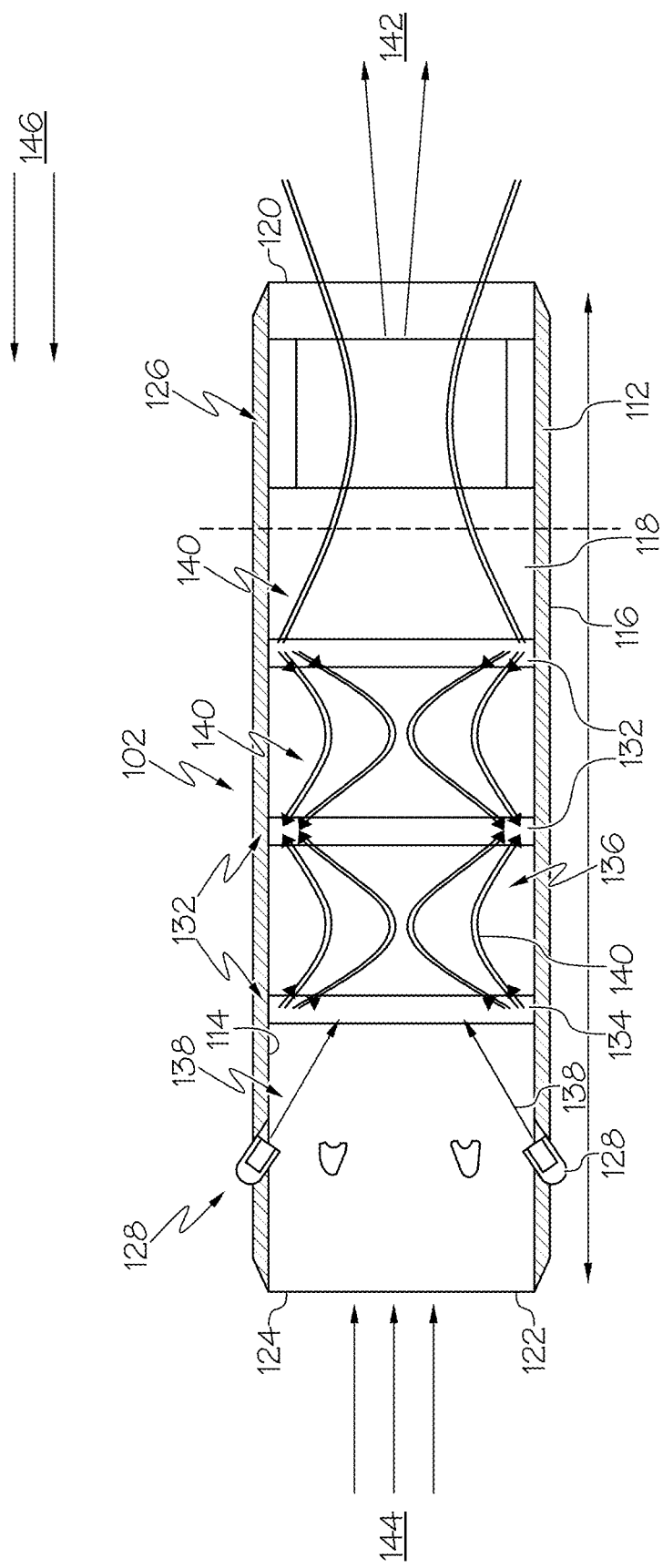
FIG. 4 depicts a block diagram of another embodiment of an air-breathing thruster similar to that of FIG. 3 in accordance with one embodiment of the present invention.

FIGS. 3 and 4 depict a block diagram of an air-breathing thruster, generally designated 100/102 respectively moving in the direction of travel 146, in accordance with one embodiment of the present invention. In the illustrated embodiments in FIG. 3, thruster 100 is generally cylindrical and includes a thruster wall 112 having an inner surface 114 and an outer surface 116, where inner surface 114 defines a cylindrical channel 118 having a length longer than an ionization mean free path for electrons to ionize the incoming airflow. In one or more embodiments, this ionization mean free path has a length extending from a few millimeters at an altitude of 100 km to nearly 1 m at the altitude of 150-160 km, and several meters at 200 km for example but different lengths are contemplated.

Thruster 100 further includes a first end 120 and an opposing second end 124. In the illustrated embodiment of FIG. 3, the first end 120 is an inlet at face/frontal area 122 which collects the atmosphere 144 and the second end 124 comprises an outlet in fluid communication with the first end 120 and the cylindrical channel 118, which is adapted to receive a volume of air.

It should be appreciated that as the thruster 100 moves through the atmosphere 144 at VLEO, a drag force is generated, wherein such drag force is generated by the interactions/collisions of the incoming air (molecules and atoms) with the thruster walls 112 and surfaces. In other words, drag is the resistance of the air to a moving thruster and/or satellite. One key idea of any thruster/satellite design is to compensate for drag using a thruster for example. In one or more embodiments of the present invention, frontal drag is generated by the interactions/collisions of the atmosphere 144 with the first end/frontal area 122, which in one embodiment, is only the thickness of the thruster wall 112. Additionally, skin drag is generated by interactions/collisions of the atmosphere 144 with the inner and outer surfaces 114 and 116. It should be appreciated that frontal drag is dominant. Therefore, one key element of the present invention is to reduce at least frontal drag, therefore reducing power demands to move the thruster 100.

FIG. 3 illustrates thruster 100 includes one or more anodes 126 proximate inlet 120 and a plurality of cathodes 128 proximate outlet 124. As illustrated, the inner surface 114 is adapted to receive one or more segmented electrodes, where the segmented electrodes include one or more ring-shaped electrodes 132.

In one embodiment, an additional, intermediate electrode which may comprise a ring electrode, a semi-ring electrode, a non-ring electrode, and combinations thereof is proximate outlet 124 is an exit electrode 134. In one exemplary embodiment, exit electrode 134 is biased positive, while one or more of the remaining ring-shaped electrodes 132 are biased negative with respect to this exit electrode 134. Alternative embodiments include only the anode electrode 126 is positive with respect to the cathode, where the electrodes 132 and 134 are negative with respect to the anode 126 and may even more negative (or at the same potential) with respect to the cathode 128.

It should be appreciated that the fringing magnetic field of the diverging shape exists at both ends of the thruster 100. A bias voltage may be applied to one or more of the ring-shaped electrodes which may be a DC, an RF, a pulsed, and/or combinations thereof (e.g., DC-RF, pulsed DC, pulsed RF, pulsed DC-RF). In one or more embodiments, one or more of the negative biased ring-shaped electrodes 132 is electron emitting, either via an ion-induced secondary electron emission, thermionic emission, field emission and/or combinations thereof. In addition, an extra bias may be applied between the electrodes 132 to control the electron flow between the ring-shaped electrodes 132.

FIG. 3 further illustrates one or more magnetic fields 136 generated by one or more ring electrodes 132 and/or exit electrodes 134. Flux lines of the magnetic fields 136 are designated 140. Electron beams 142 are generated by the cathodes 128 and/or help confine the electron beams 138. In one or more embodiments, it is contemplated that electrodes 132 may also help to confine electron beams. Finally, FIG. 3 further illustrates thruster 100 generating a plasma jet 142 at outlet 124, which in at least one embodiment may be used to move the thruster 100 in the direction of travel 146.

FIG. 4 illustrates a thruster 102 further includes a first end 120 and an opposing second end 124. In the embodiment illustrated in FIG. 4, second end 124 is an inlet at face/frontal area 122 which collects the atmosphere 144 and first end 122 comprises an outlet in fluid communication with the inlet and the cylindrical channel 118, which is adapted to receive a volume of air.

FIG. 4 illustrates thruster 102 includes one or more anodes 126 proximate first end 124 and a plurality of cathodes 128 proximate second end 120. As illustrated, the inner surface 114 is adapted to receive one or more segmented electrodes, where the segmented electrodes include one or more ring-shaped electrodes 132. In at least one embodiment, the ring-shaped electrodes 132 are placed along the inner surface 114.

In one embodiment, a ring-shaped electrode proximate second end is an exit electrode 134. In one exemplary embodiment, exit electrode 134 is biased positive, while one or more of the remaining ring-shaped electrodes 132 are biased negative with respect to this exit electrode 134. It should be appreciated that the fringing magnetic field of the diverging shape exists at both ends of the thruster 102. Alternative embodiments include only the anode electrode 126 is positive with respect to the cathode, where the electrodes 132 and 134 are negative with respect to the anode 126 and may even more negative (or at the same potential) with respect to the cathode 128. In an embodiment, a bias voltage may be applied to one or more of the ring-shaped electrodes which may be a DC, an RF, a pulsed, and/or combinations thereof (e.g., DC-RF, pulsed DC, pulsed RF, pulsed DC-RF). In one or more embodiments, one or more of the negative biased ring-shaped electrodes 132 are electron emitting, either via an ion-induced secondary electron emission, thermionic emission, field emission and/or s132 to control the electron flow between the ring-shaped electrodes 132.

FIG. 4 further illustrates one or more magnetic fields 136 generated by one or more ring electrodes 132 and/or exit electrodes 134. Flux lines of the magnetic fields 136 are designated 140. Electron beams 142 are generated by the cathodes 128. In one or more embodiments, the magnetic fields and electrodes 132 and 134 confine the electron beams along the channel generated by cathode 128 . . . . Finally, FIG. 4 further illustrates thruster 102 generating a plasma jet 142 at first end 120, which in at least one embodiment may be used to move the thruster 102 in the direction of travel 146.

Figure 1:
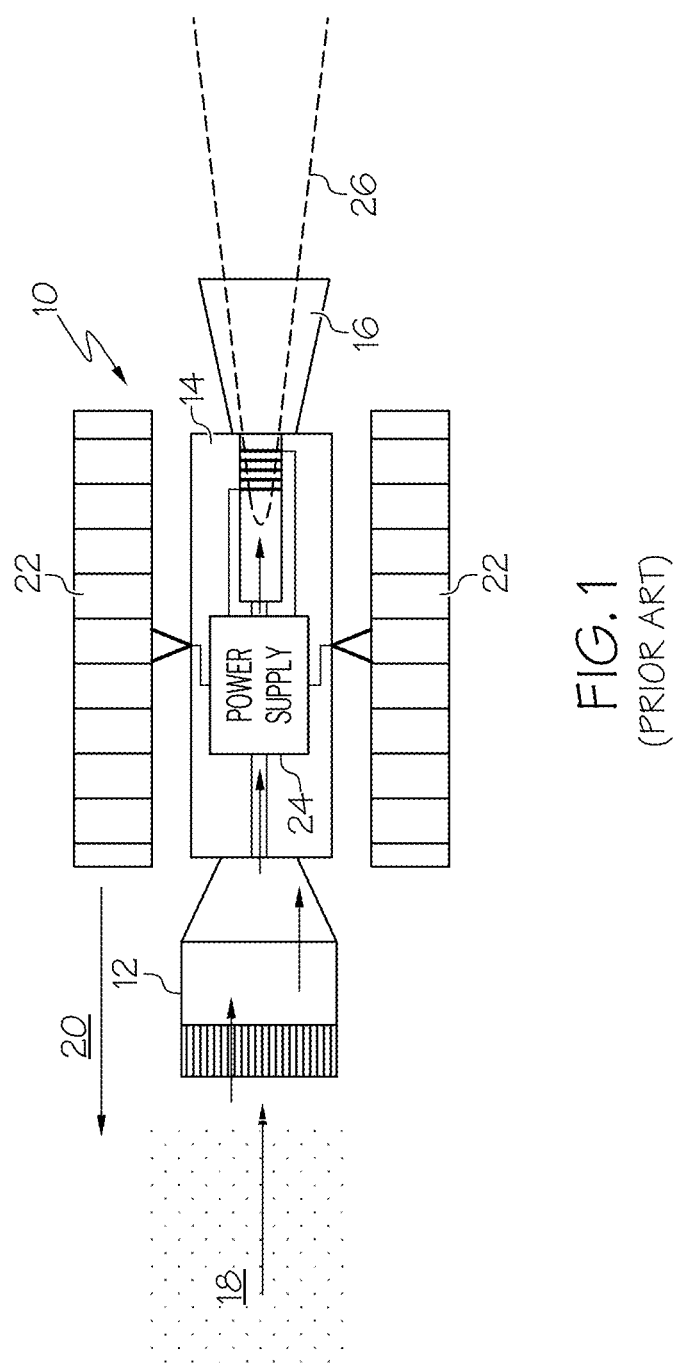
FIG. 1 depicts a block diagram of a known ABEP thruster.
Figure 2:
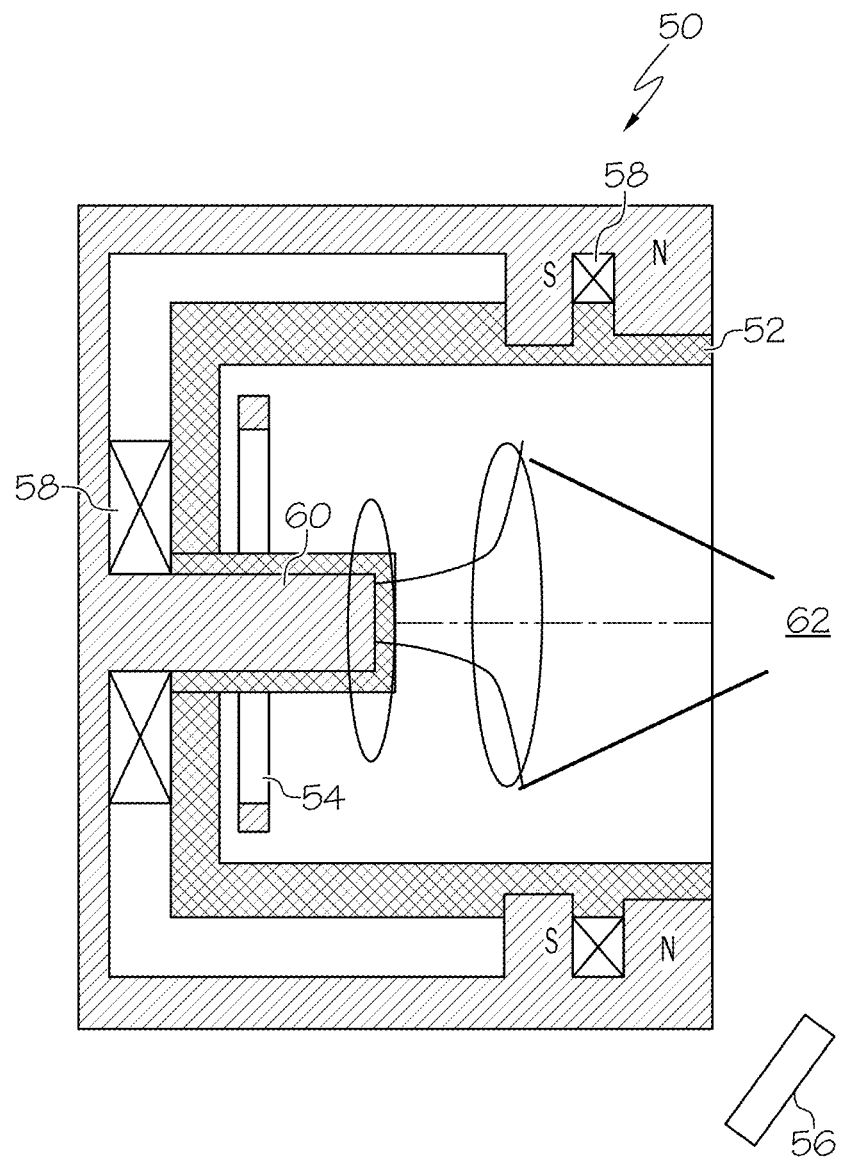
FIG. 2 depicts a block diagram of a known cylindrical Hall thruster.

In one or more embodiments, effective ionization is supported by electron beams 138. The electron beams 138 are generated by the electron emission from one or more negative biased electrodes 132/134 placed on the thruster wall 112 at inner surface 114. Cathodes 128 (RF-plasma cathodes for example) may also be used as the source of non-thermal electrons. The energy distribution function of electrons injected into the plasma from the cathode 128 can be shaped to avoid plasma-beam instabilities (e.g., modulated instability). In embodiments at lower attitudes and higher pressure, in addition or instead of the electron beams, the ionization may be sustained by nanosecond electrical pulses. The resulting ions are then accelerated by an ExB stage which is conceptually similar to the cylindrical Hall thruster (See FIG. 2). In the embodiment illustrated in FIG. 4, this accelerating stage is formed by the exit electrode, which is biased positive with respect to cathodes 128, while in the embodiment illustrated in FIG. 3 the accelerating stage is formed by the exit electrode which is biased negative with respect to the anode 126. The electron beams emitted from the ring electrodes are guided by the magnetic field to ionize air in the whole cylindrical channel 118. In addition, a fraction of these electrons escaped from the thruster 100/102 with the accelerated ions thereby neutralizing the outgoing ion flow in terms of both charge (quasi-neutrality) and current (zero-current or ambipolarity) neutrality.

In one or more embodiments, to sustain ionization by electron beam at low pressure (mtorr and below), the thruster needs to be long enough so that the ionization probability of incoming high-speed air would be reasonably high. In one embodiment, the length of the thruster 100/102 is longer than the ionization mean free path for electrons to ionize incoming airflow, greater than about 1 meter (2 meters for example). A long length of the apparatus will increase the slipping friction of the air on the outer side wall of the thruster. As a result, power requirements would growth with the thruster length.

Figure 5:
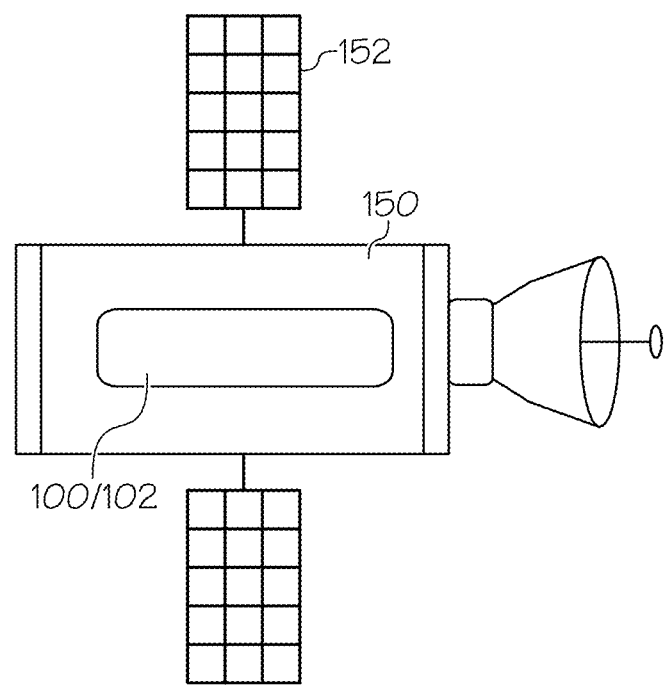
FIG. 5 depicts a block diagram of a satellite using an air-breathing thruster of FIGS. 3 and 4 in accordance with one embodiment of the present invention.

FIG. 5 depicts a block diagram of a satellite 150 having solar arrays 152 using an air-breathing thruster 100/102 in accordance with one embodiment of the present invention. It should be appreciated that while one thruster 100/102 is shown, 2 or more thrusters are contemplated. Further, thrusters 100/102 may be coupled to satellite 150 or otherwise incorporated therein.

Figure 6:
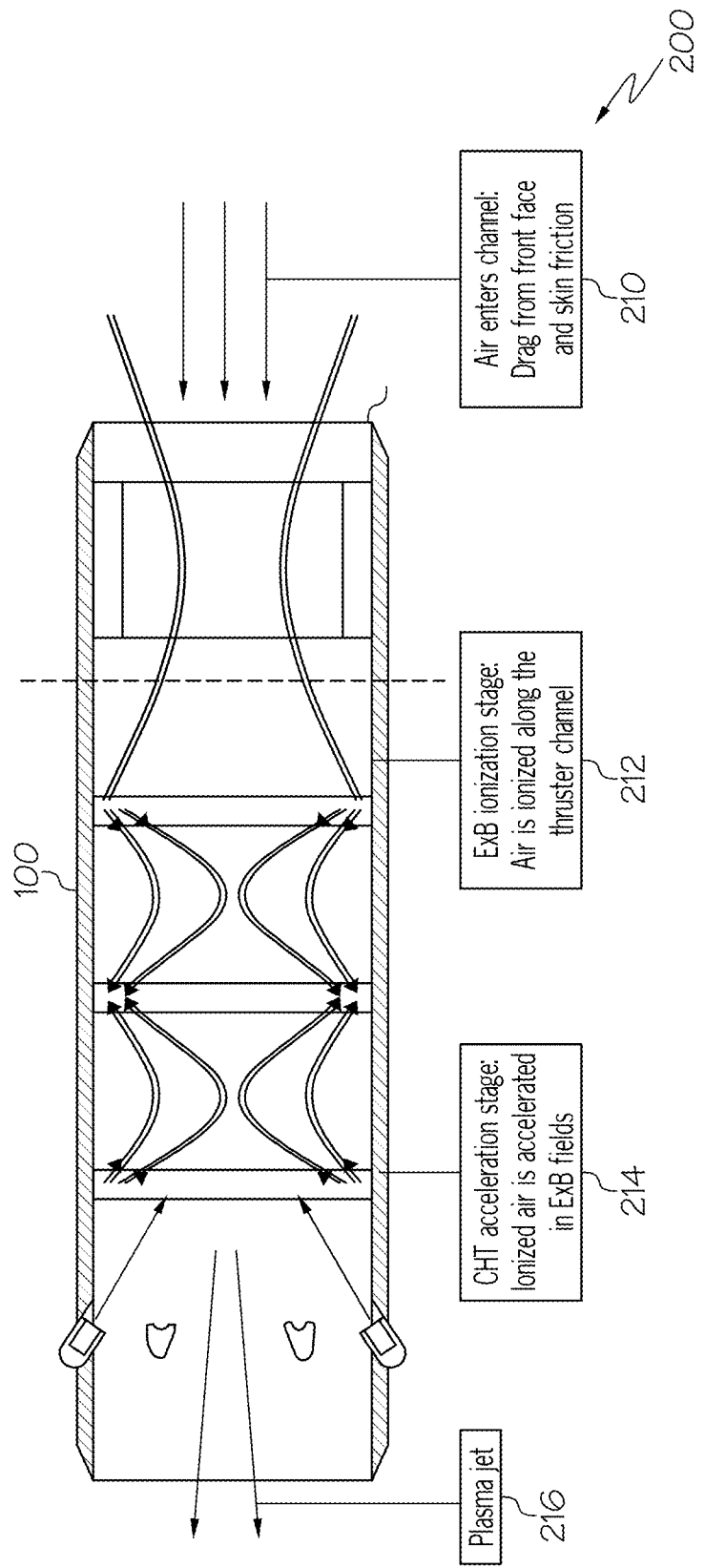
FIG. 6 depicts a process for operating an air-breathing thruster similar to that of FIG. 3 in accordance with one embodiment of the present invention.
Figure 7:
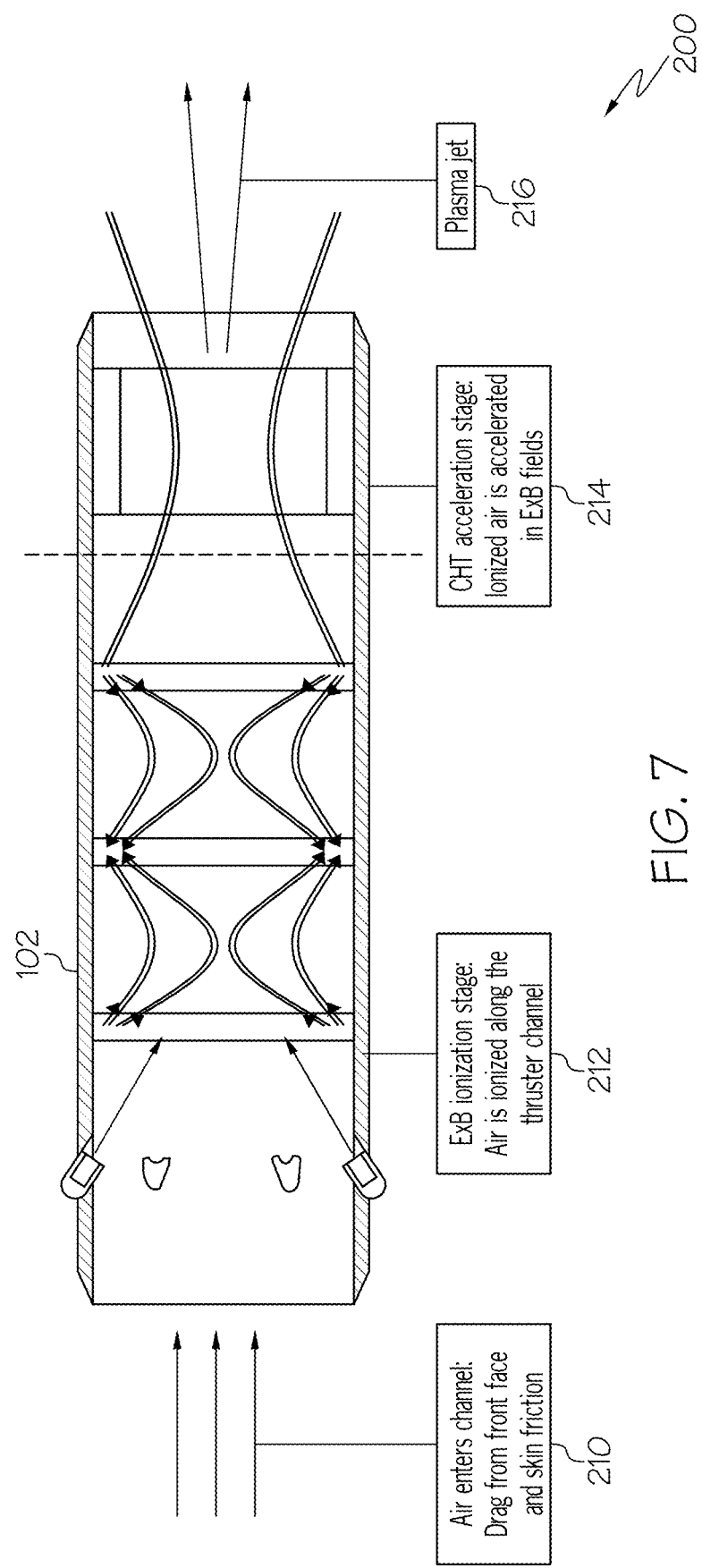
FIG. 7 depicts a process for operating an air-breathing thruster similar to that of FIG. 4 in accordance with one embodiment of the present invention.

FIG. 6 depicts a process 200 for operating an air-breathing thruster similar to that of FIG. 3 while FIG. 7 depicts a process 200 for operating an air-breathing thruster similar to that of FIG. 4 in accordance with embodiments of the present invention.

FIGS. 6 and 7 illustrate process 200 includes airflow entering channel 210, due to drag from the front face and skin for example. In accordance with one embodiment of process 200, air is ionized along the thruster channel 212, where in one embodiment effective ionization is supported by electron beams. The electron beams are generated by the electron emission from the cathodes and one or more negative biased electrodes placed on the thruster wall as illustrated in FIGS. 3 and 4 and discussed previously. In at least one embodiment, RF-plasma cathodes may also be used as the source of non-thermal electrons. The energy distribution function of electrons injected into the plasma from the cathode can be shaped to avoid plasma-beam instabilities (e.g., modulated instability). For lower attitudes and higher pressure, in addition to or instead of the electron beams, the ionization may be sustained by nanosecond electrical pulses. The resulting ions are then accelerated by an ExB stage 214 which, in one embodiment, is conceptually similar to the cylindrical Hall thruster. This accelerating stage is formed by the cathode for the embodiment illustrated in FIG. 6 and the exit electrode which is biased positive with respect to cathode and ring electrodes for the embodiment illustrated in FIG. 7. The electron beams emitted from the wall electrodes are guided by the magnetic field to ionize air in the whole cylindrical channel. In addition, a fraction of these electrons escaped from the thruster with the accelerated ions thereby neutralizing the outgoing ion flow in terms of both charge (quasi-neutrality) and current (zero-current or ambipolarity) neutrality. Finally, a plasma is output, 216.

To sustain ionization by electron beams at low pressure (mtorr and below), the thruster needs to be long enough so that the ionization probability of incoming high-speed air would be reasonably high. In one or more embodiments, the cylindrical chamber is longer than an ionization mean free path for electrons to ionize incoming air flow, the ionization mean free path having a length extending from a few millimeters at an altitude of 100 km to nearly 1 m at the altitude of 150-160 km, and several meters at 200 km for example, although other lengths are contemplated. A long length of the apparatus will increase the slipping friction of the air on the outer side wall of the thruster. As a result, power requirements would growth with the thruster length.

Figure 8:
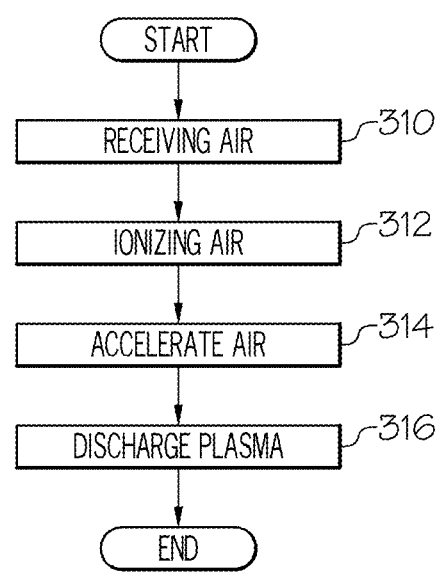
FIG. 8 depicts a flow diagram illustrating a method of forming a plasma jet using an air-breathing plasma thruster of FIGS. 3 and 4 in accordance with one embodiment of the present invention.

FIG. 8 depicts a flow diagram illustrating a method 300 of forming a plasma jet using an air-breathing plasma thruster similar to that of FIGS. 3 and 4 in accordance with one embodiment of the present invention. In one embodiment illustrated in FIG. 8, method 300 includes receiving incoming airflow 310. In one or more embodiments, the airflow is received in a cylindrical channel defined by the inside wall of the air-breathing thruster, forming a volume of air. The method includes ionizing the volume of air 312. In at least one embodiment, the air is ionized using electron beams generated by cathodes and confined by segmented electrodes and a cusp magnetic field, forming ionized air.

Method 300 further includes accelerating the ionized air 314. In at least one embodiment the air is accelerated using applied electric and diverging magnetic fields, forming a plasma jet. The method includes generating the plasma jet 316 at an outlet of the air-breathing thruster for example.

Having described the basic concept of the embodiments, it will be apparent to those skilled in the art that the foregoing detailed disclosure is intended to be presented by way of example. Accordingly, these terms should be interpreted as indicating that insubstantial or inconsequential modifications or alterations and various improvements of the subject matter described and claimed are considered to be within the scope of the spirited embodiments as recited in the appended claims. Additionally, the recited order of the elements or sequences, or the use of numbers, letters, or other designations therefor, is not intended to limit the claimed processes to any order except as may be specified. All ranges disclosed herein also encompass any and all possible sub-ranges and combinations of sub-ranges thereof. Any listed range is easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as up to, at least, greater than, less than, and the like refer to ranges which are subsequently broken down into sub-ranges as discussed above. As utilized herein, the terms "about," "substantially," and other similar terms are intended to have a broad meaning in conjunction with the common and accepted usage by those having ordinary skill in the art to which the subject matter of this disclosure pertains. As utilized herein, the term "approximately equal to" shall carry the meaning of being within 15, 10, 5, 4, 3, 2, or 1 percent of the subject measurement, item, unit, or concentration, with preference given to the percent variance. It should be understood by those of skill in the art who review this disclosure that these terms are intended to allow a description of certain features described and claimed without restricting the scope of these features to the exact numerical ranges provided. Accordingly, the embodiments are limited only by the following claims and equivalents thereto. All publications and patent documents cited in this application are incorporated by reference in their entirety for all purposes to the same extent as if each individual publication or patent document were so individually denoted.

All numeric values are herein assumed to be modified by the term "about", whether or not explicitly indicated. The term "about" generally refers to a range of numbers that one of skill in the art would consider equivalent to the recited value (e.g., having the same function or result). In many instances, the terms "about" may include numbers that are rounded to the nearest significant figure.

The recitation of numerical ranges by endpoints includes all numbers within that range (e.g., 1 to 5 includes 1, 1.5, 2, 2.75, 3, 3.80, 4, and 5).

One skilled in the art will also readily recognize that where members are grouped together in a common manner, such as in a Markush group, the present invention encompasses not only the entire group listed as a whole, but each member of the group individually and all possible subgroups of the main group. Accordingly, for all purposes, the present invention encompasses not only the main group, but also the main group absent one or more of the group members. The present invention also envisages the explicit exclusion of one or more of any of the group members in the claimed invention.

What is claimed is:

1. An air-breathing plasma thruster comprising:
   a thruster wall defining a cylindrical channel, the cylindrical channel having a first end and an opposing second end in fluid communication with the first end, the cylindrical channel adapted to receive incoming airflow;
   an anode at the first end of the cylindrical channel;
   a cathode at the second end of the cylindrical channel opposite the first end; and
   at least one additional, intermediate electron-emitting electrode positioned on the thruster wall.

2. The air-breathing plasma thruster of claim 1 wherein the at least one, additional intermediate electrode is selected from the group consisting of a ring electrode, a semi-ring electrode, a non-ring electrode, and combinations thereof.

3. The air-breathing plasma thruster of claim 1 wherein the at least one, additional intermediate electrode is positioned proximate the first end.

4. The air-breathing plasma thruster of claim 1 wherein the at least one, additional intermediate electrode is biased positive.

5. The air-breathing plasma thruster of claim 1 wherein at least the anode is biased positive.

6. The air-breathing apparatus of claim 1 wherein the first end is an inlet having the anode and the at least one, additional intermediate electrode is at least one ring electrode proximate thereto and the second end is an outlet having the cathode proximate thereto.

7. The air-breathing apparatus of claim 1 wherein the second end is an outlet having the cathode and the at least one, additional intermediate electrode is at least one ring electrode proximate thereto and the first end is an inlet having the anode proximate thereto.

8. The air-breathing plasma thruster of claim 1 further comprising a plurality of ring electrodes positioned on the thruster wall and biased negative with respect to the anode.

9. The air-breathing plasma thruster of claim 8 wherein a bias voltage is applied to the plurality of ring electrodes wherein the bias voltage is selected from the group consisting of a DC bias, an RF bias, a pulsed bias, and a combination of a DC-RF and pulsed bias.

10. The air-breathing plasma thruster of claim 8 wherein at least one of the plurality of electrodes is the electron-emitting electrode.

11. The air-breathing plasma thruster of claim 10 wherein the electron-emitting electrode is selected from the group consisting of ion-induced secondary electron emission electrodes, thermionic emission electrodes, field emission electrodes and plasma cathodes.

12. The air-breathing plasma thruster of claim 8 further comprising an extra bias applied to the plurality of ring electrodes, wherein the extra bias is configured to control electron flow between the electrodes and plasma flow in the channel.

13. The air-breathing plasma thruster of claim 1 wherein the cylindrical chamber is longer than an ionization mean free path for electrons to ionize incoming air flow.

14. The air-breathing plasma thruster of claim 13 wherein the ionization mean free path has a length.

15. A satellite having an air-breathing plasma thruster, the air-breathing plasma thruster comprising:
   a thruster wall having a plurality of magnetic fields formed therein and defining a cylindrical channel, the cylindrical channel having a first end and an opposing second end in fluid communication with the first end, the cylindrical channel adapted to receive an incoming airflow;
   an anode proximate the first end;
   a cathode proximate the second end;
   at least one exit ring electrode biased positive and positioned on the thruster wall between the anode and the cathode; and
   a plurality of ring electrodes biased negative with respect to the anode and positioned on the thruster wall between the at least one exit electrode and the anode.

16. The satellite of claim 15 wherein the first end is an inlet having the anode and at least one ring electrode of the plurality of ring electrodes proximate thereto and the second end is an outlet having the cathode proximate thereto.

17. The satellite of claim 15 wherein the second end is an outlet having the cathode and at least one ring electrode proximate to the second end and the first end is an inlet having the anode proximate thereto.

18. The satellite of claim 15 wherein the anode is biased positive and the plurality of ring electrodes are biased negative with respect to the anode.

19. The satellite of claim 15, wherein the satellite is adapted to operate at very low orbits at an altitude below 250 km.

20. The satellite of claim 19 wherein the satellite is adapted to operate at very low orbits between 70 and 250 km.

21. A method of forming a plasma jet using an air-breathing plasma thruster, the method comprising:
   receiving incoming air flow in a cylindrical channel defined by the inside wall of the air-breathing thruster, forming a volume of air;
   ionizing the volume of air using electron beams generated by cathodes and confined by segmented electrodes and one or more magnetic field cusps, forming ionized air;
   accelerating the ionized air using applied electric and diverging magnetic fields, forming a plasma jet; and
   generating the plasma jet at an outlet of the air-breathing thruster.

* * * * *